United States Patent
Smith

(10) Patent No.: US 8,650,976 B2
(45) Date of Patent: Feb. 18, 2014

(54) GYRO STABILIZER

(76) Inventor: Tom Smith, Yorba Linda, CA (US)

( * ) Notice: Subject to any disclaimer, the term of this patent is extended or adjusted under 35 U.S.C. 154(b) by 566 days.

(21) Appl. No.: 12/839,636

(22) Filed: Jul. 20, 2010

(65) Prior Publication Data

US 2012/0017709 A1 Jan. 26, 2012

(51) Int. Cl.
*G01C 19/30* (2006.01)
*G01C 19/06* (2006.01)

(52) U.S. Cl.
USPC .................................. 74/5.47; 74/7

(58) Field of Classification Search
USPC ............... 74/5.22, 5.4, 5.41, 5.45, 5.47, 5.7; 482/44, 45
See application file for complete search history.

(56) References Cited

U.S. PATENT DOCUMENTS

| | | | | |
|---|---|---|---|---|
| 3,263,507 A | * | 8/1966 | Appleton | 74/5.7 |
| 3,357,242 A | * | 12/1967 | Bonnell et al. | 73/178 R |
| 3,726,146 A | * | 4/1973 | Mishler | 74/5 R |
| 7,381,155 B2 | * | 6/2008 | Chuang et al. | 482/45 |
| 7,437,961 B2 | * | 10/2008 | Dworzan | 74/5.47 |
| 7,935,035 B2 | * | 5/2011 | Smith | 482/110 |

* cited by examiner

*Primary Examiner* — Troy Chambers
*Assistant Examiner* — Jude Agendia
(74) *Attorney, Agent, or Firm* — Clement Cheng

(57) ABSTRACT

A gyroscope power starter has a housing having a bottom and a concave head slanted at a predetermined angle relative to the housing, the concave head engaging a gyroscope rotor. An electric power source is mounted on the housing. A motor is rigidly mounted to a housing. The motor is connected to the power source for producing a rotational power in response to a switching force. A power rotor is connected in unity with the motor and protruding from an opening into the concave head of the housing to transmit the rotational motor power to the gyroscope rotor. An alignment member is formed in a concave center area. The alignment member protrudes into a groove of a gyroscopic rotor when the gyroscopic rotor is rotating.

10 Claims, 5 Drawing Sheets

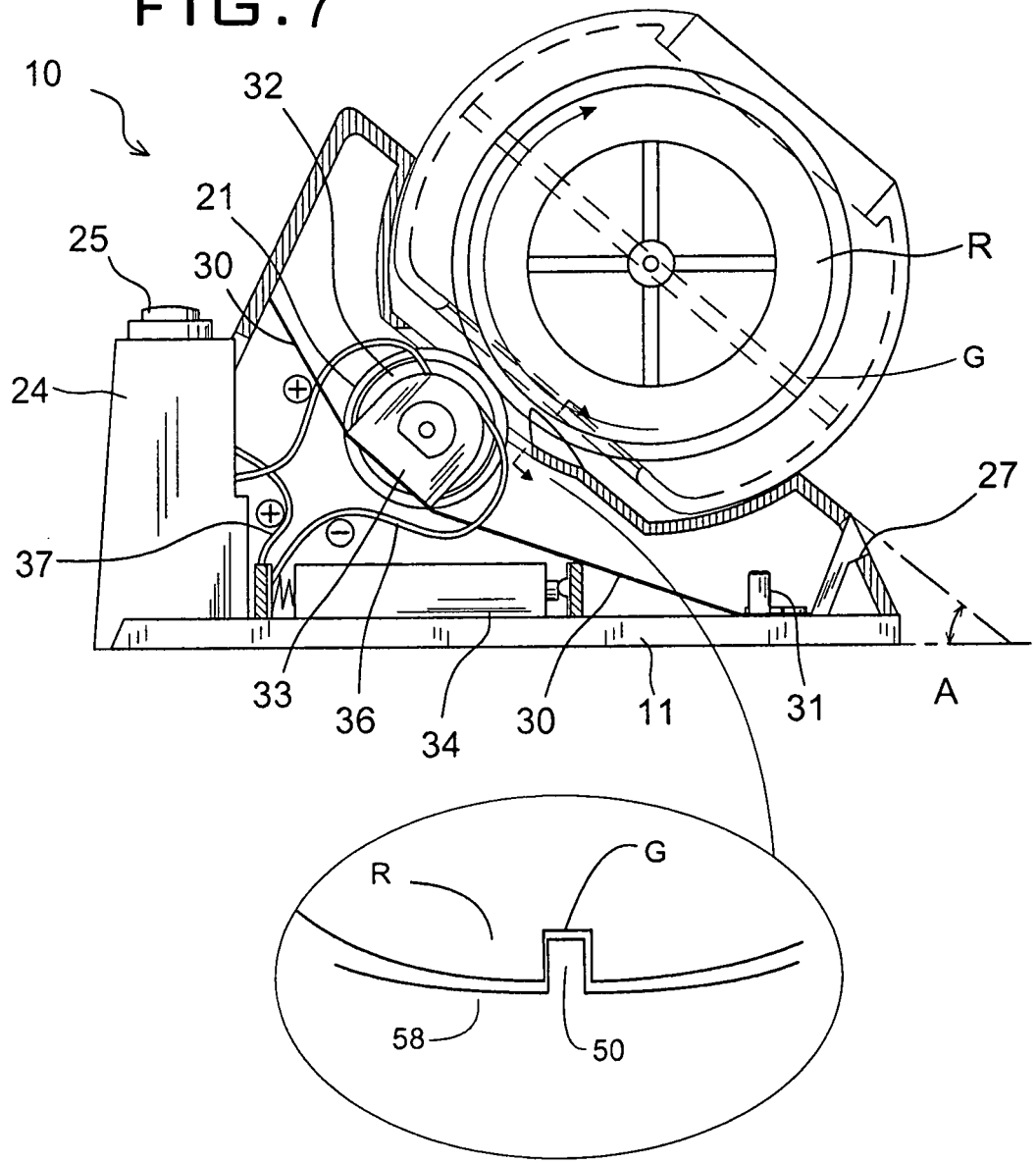

GYRO STABILIZER

BACKGROUND OF THE INVENTION

A. Field of the Invention

The present invention is in the field of gyroscope starting docks.

B. Description of the Prior Art

Gyroscopes have a myriad of diverse purposes, ranging from recreational spinning tops and yoyos to the essential balancing component within motorcycles. The gyroscopic resistance against directional changes of spin axis can be translated into a resistance useful for muscular exercises. As a result, an array of arm and hand exercise equipment has been developed using such scientific principles.

A fundamental gyroscopic wrist exerciser originally appeared within U.S. Pat. No. 3,726,146 issued to Archie Mishler, the disclosure of which is incorporated herein by reference. Silkebakken illustrates subsequent modifications to the original design in U.S. Pat. No. 4,150,580, and Frederick Mishler follows suit in U.S. Pat. No. 5,150,625; both of which are also incorporated herein by reference. Upon initial usage, those with minimal hand strength have trouble starting the gyroscopic wrist exercisers, and unfortunately, this is the category of people with the greatest potential to benefit from the device.

Early gyroscopic wrist exercisers were started by a pull string wound around the gyro rotor. Eventually, an electric hand-starter was incorporated into the apparatus, creating an initial spinning momentum from which the user could take control during workout. The starter is a hand-held electric tool that can rotationally push a gyro rotor within the outer casing of the hand exerciser, which is held in the air by the opposing hand.

Dworzan in U.S. Pat. No. 7,437,961 issued Oct. 21, 2008 discusses a power dock for starting a gyroscopic wrist exerciser. Dworzan discusses the power starting dock as follows:

In reference to FIGS. 1 and 2, a power dock 10 resembles a truncated hexagonal pyramid with a flat bottom 11, an upper shell 12, and slanted sidewalls 13. The dock 10 can be placed on any surface, including and not limited to a desktop. A user may also prefer to hold the device; the invention is easily made portable due to its minimal weight, which can be as little as the accompanying gyroscope 14. The gyroscope 14 shown depicts the exercise type and has a gyro rotor R, although the present invention is easily adaptable to various types of portable gyroscope products.

The dock 10 has a top face 15 slanted forward creating the acute angle A, preferably measuring thirty-nine degrees relative to the flat bottom 11, as shown in FIG. 3. This angle is significant in the present invention because it functions to simultaneously support and drive the gyroscope 13 automatically.

Six outer side edges 16 and a central basin area 17 define the top face 15. The basin area 17 has a large annular edge 18 on which the gyroscope 14 rests. The annular edge 18 extends to a lower stepped surface 19 by an annular wall 20 at a downward converging angle. The lower surface 19 lies parallel to the top face 15.

The power dock 10 may take different shapes, including a three-sided pyramid, a truncated circular cone, or an irregular form. The possibilities are virtually limitless, as long as the power dock provides an anti-cam-out drive for the gyroscope 14 as described in detail below.

The basin 17 is adapted to receive the gyroscope 14 so that it makes a driving engagement with the power dock 10. To provide a unique supportive driving force to the gyroscope 14, an electrically powered rotor 21 is spring-mounted and protrudes at the basin area 17 through an elongated opening 22 formed in the lower surface 19. The rotor 21 may be rubberized over its circumferential areas to provide a good frictional contact with the gyro rotor R.

The lower surface 19 has a concave center area 23, which may superimpose the elongated opening 22 corresponding to the general spherical surface of the gyroscope 13 to be seated.

At the rear sidewall 13, an upright mount 24 that protrudes from the bottom 11 supports a starting button 25. The electrical pushbutton switch completes the circuit only upon depression and immediately breaks the circuit as the switch is released. This eliminates the need for the user to generate any additional motions to start the gyroscope 14 while on the power dock 10.

The rear sidewall 12 bears a cutout for the mount 24 to pass through. Two latches 26 located in the frontal area of the bottom 11 protrude upward, and corresponding holes 27 are formed in the upper shell 12. This allows the bottom 11 to first lock into the shell 12 at the front. The components are additionally fastened at the rear by a screw, which is threaded through the rear sidewall 13 and an upright open slot 28 shown in FIG. 4. For ease of battery replacement, the interior of the power dock can be exposed by simply unscrewing and pulling the shell 12 upward from the bottom 11.

A leaf spring 30 is cantilevered by a post 31 integral to the bottom 11 and suspends a motor 32, which is clipped at its opposite ends by two upwardly bent side plates 33 of the leaf spring 30. In addition, the rotating axis of the motor 32 is fixed to a center bore of the power rotor 21. The spring 30 normally keeps the motor/rotor assembly at a neutral position in the interior of the upper shell 12, with a circumferential section of the power rotor 21 always forced towards the upper front of the power dock 10.

In this embodiment, batteries 34 of three volts are mounted on board to power the motor 32 and the rotor 21, although different rates of motors and power sources may be used as well. A four-sided open compartment 35 holds the batteries 34 under spring 35 biases. The batteries 34 supply the electric power through two wires. One polarity of wire 36 directly connects to one power terminal of the motor 32, and the other polarity of wire 37 is connected through the switch 25 to the other power terminal of the motor 32 in series. It would be possible to operate using a rechargeable battery, which can be connected to a household outlet through an appropriate adaptor.

The installation of the starting button 25 is arbitrary. If desired, the starting button 25 may be replaced by simple electrical terminals arranged under the leaf spring 30 to make or break the power circuit. This particular assembly option capitalizes on the weight or depression of the gyroscope 14.

FIG. 5 illustrates the positional relation of the power rotor 21 to the surrounding components from a frontal perspective. During operation, power dock 10 is laid on a considerably level surface, as shown in FIG. 3.

The power dock 10 receives the gyroscope 14 in the angled basin area 17 with the gyro rotor R oriented in the same rotational direction as the power rotor 21. This configuration ensures that the spring mounted motor 32 keeps the gyro rotor R from bouncing, thus causing a "cam out" as the start button 25 is pushed. The angled surface 19 of the basin area 17 keeps exactly half of the axle weight of the gyro rotor R on the annular wall 20 of the basin area 17 to control "cam out".

Therefore, the angled basin area 17, leaf spring 26, motor 32 and rotor 21 collectively form a docking base to consistently start the gyroscope 14.

When creating the initial momentum for gyroscope hand/arm exercisers, the power dock 10 may only be used to start the gyro rotor until it reaches a threshold speed. The user must then take over the momentum of the exerciser by applying his/her strength to keep the gyro rotor moving. The upper shell 12 of the invention can be customized to fit a different gyroscope for educational or entertainment purposes. In this case, the power dock 10 may be used repeatedly as needed when the rotator loses inertia.

The motor is flexibly mounted to account for the fact that some gyro rotors are not very concentric with the axle. A rigidly mounted motor may cause the gyro to bounce, lose its seating, and then precess while spinning at the starting RPM. Initial speed can range from one to fifteen rotations per minute (RPM). The spring of the mounted drive should be tuned to allow the motor and drive assembly to drive the off-center rotor. The power starter has the ability to function with numerous versions of gyros, both new and old, and each with different measurements for to the rotor protrusion beyond the gyro housing. The motor height is adjustable in order to allow each gyro to sit flat in the recess cup.

The motor height is user adjustable. An optional setscrew abuts the leaf spring, thus limiting its inherent range of motion. This spring limiting member can be a high adjustable machine screw, or a rigid member that is either mounted or integrally formed with the housing of the product. The spring limiting member is typically formed integrally when the spring has a narrow range or heights. This would occur in the event wherein the device is designed to operate with a specific gyroscope model. A wide variety of calibration and adjustment options are common in art illustrating the limitation of spring member travel.

Unfortunately, after much experimentation, the Dworzan starter has been found to have less than 100% starting capability and other technical difficulties. The precession of the gyroscopic wrist exerciser presents stability problems during rotation acceleration, and tuning the stiffness of the spring is difficult.

SUMMARY OF THE INVENTION

With respect to the previously mentioned problems, it is an object of the present invention is to improve upon the prior art Dworzan starter. A gyroscope power starter has a housing having a bottom and a concave head slanted at a predetermined angle relative to the housing, the concave head engaging a gyroscope rotor. An electric power source is mounted on the housing. A motor is rigidly mounted to a housing. The motor is connected to the power source for producing a rotational power in response to a switching force. A power rotor is connected in unity with the motor and protruding from an opening into the concave head of the housing to transmit the rotational motor power to the gyroscope rotor. An alignment member is formed in a concave center area. The alignment member protrudes into a groove of a gyroscopic rotor when the gyroscopic rotor is rotating.

The gyroscope power starter optionally includes an alignment member in the shape of a fin mounted below an opening top edge. The opening may further include a pair of sidewalls. The alignment member tip can extend to an edge of the opening. The alignment member tip has a flat surface bounded by a pair of alignment member sidewalls, and the alignment member sidewalls span from an alignment member leading edge at a concave center area periphery. The alignment member sidewalls are preferably Delta shaped in the form of triangular forms. A concave center area periphery is preferably of a circular shape. The alignment member mounting area is at an area inside of a concave center area periphery between the concave center area periphery and the opening. The gyroscope power starter preferably includes an alignment member wedged shaped having a leading alignment member leading edge and a trailing alignment member tip. The motor spins so that the power rotor provides a direction of rotor rotation from a leading alignment member leading edge toward a trailing alignment member tip.

BRIEF DESCRIPTION OF THE DRAWINGS

FIG. 7 is a cross-section of the present invention.

Similar reference numbers denote corresponding features throughout the attached drawings.

Figure 1:
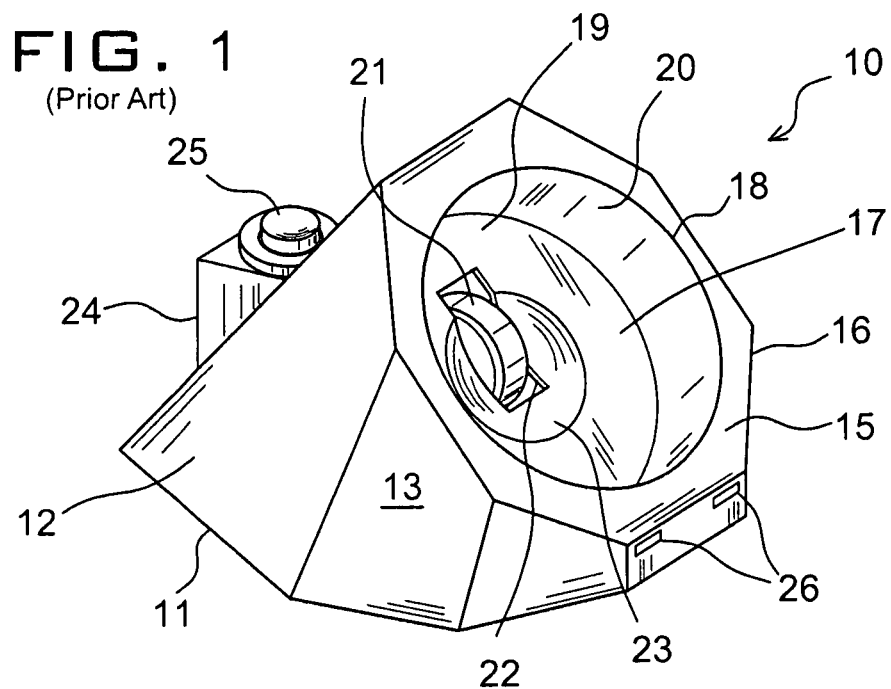
FIG. 1 is a perspective view of a prior art gyro power dock.
Figure 2:
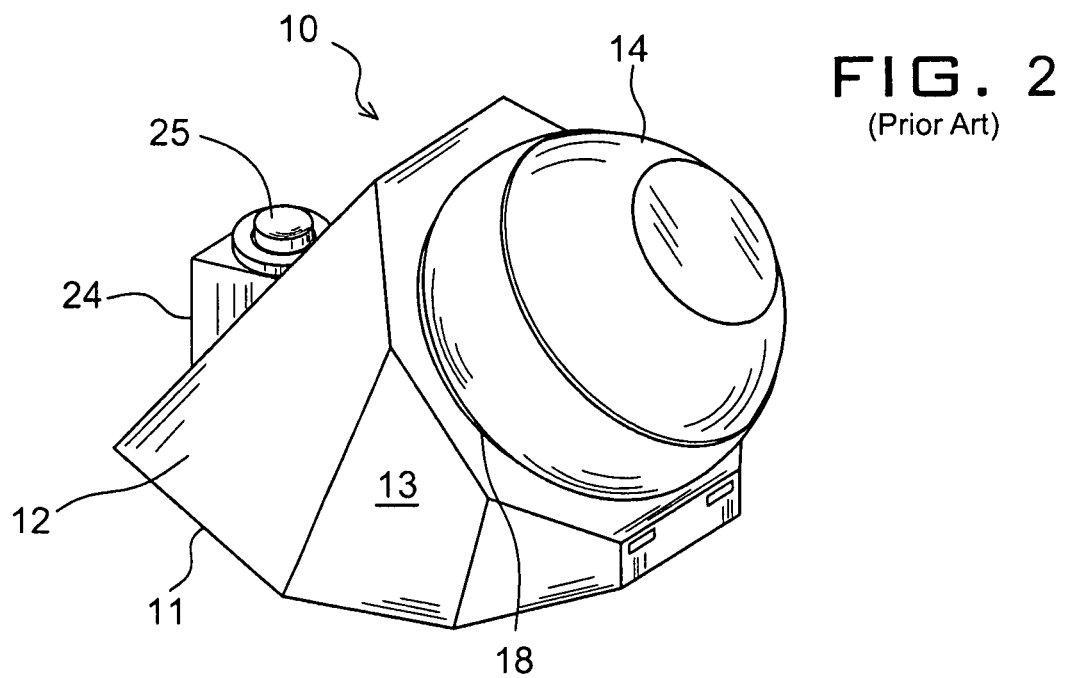
FIG. 2 is a perspective view of the prior art gyro power dock of FIG. 1 while in operation, showing an exemplary gyro hand exerciser loaded to start an internal rotor.
Figure 3:
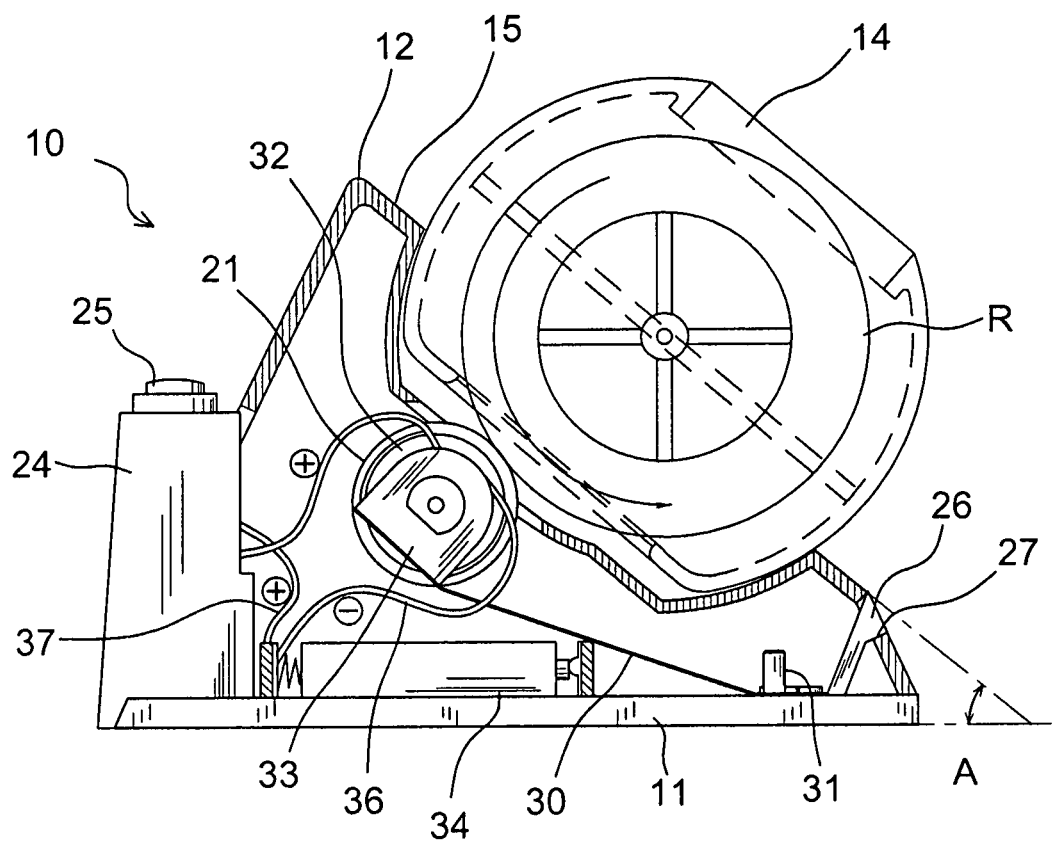
FIG. 3 is a partially exploded side view of the prior art gyro power dock of FIG. 1, which reveals a cantilevered driving rotor in contact with the gyro rotor.
Figure 4:
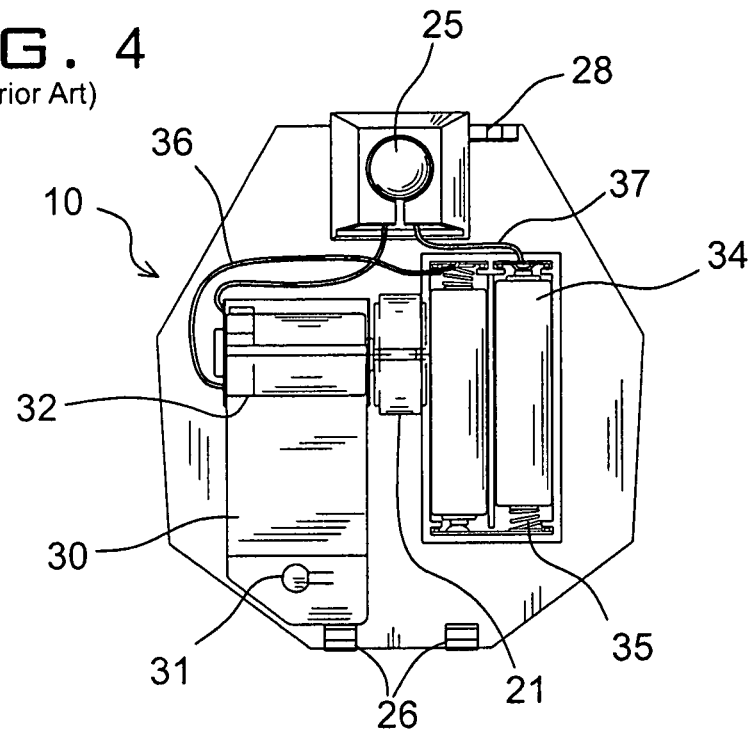
FIG. 4 is a plan view of the driving mechanism of the prior art gyro power dock of FIG. 1 with its top shell removed.
Figure 5:
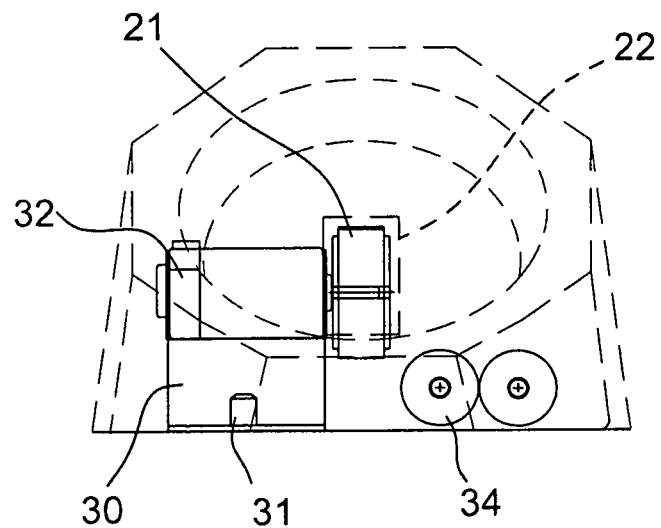
FIG. 5 is a front view of the prior art gyro power dock of FIG. 1 showing the positional level of the driving rotor inside the power dock.
Figure 6:
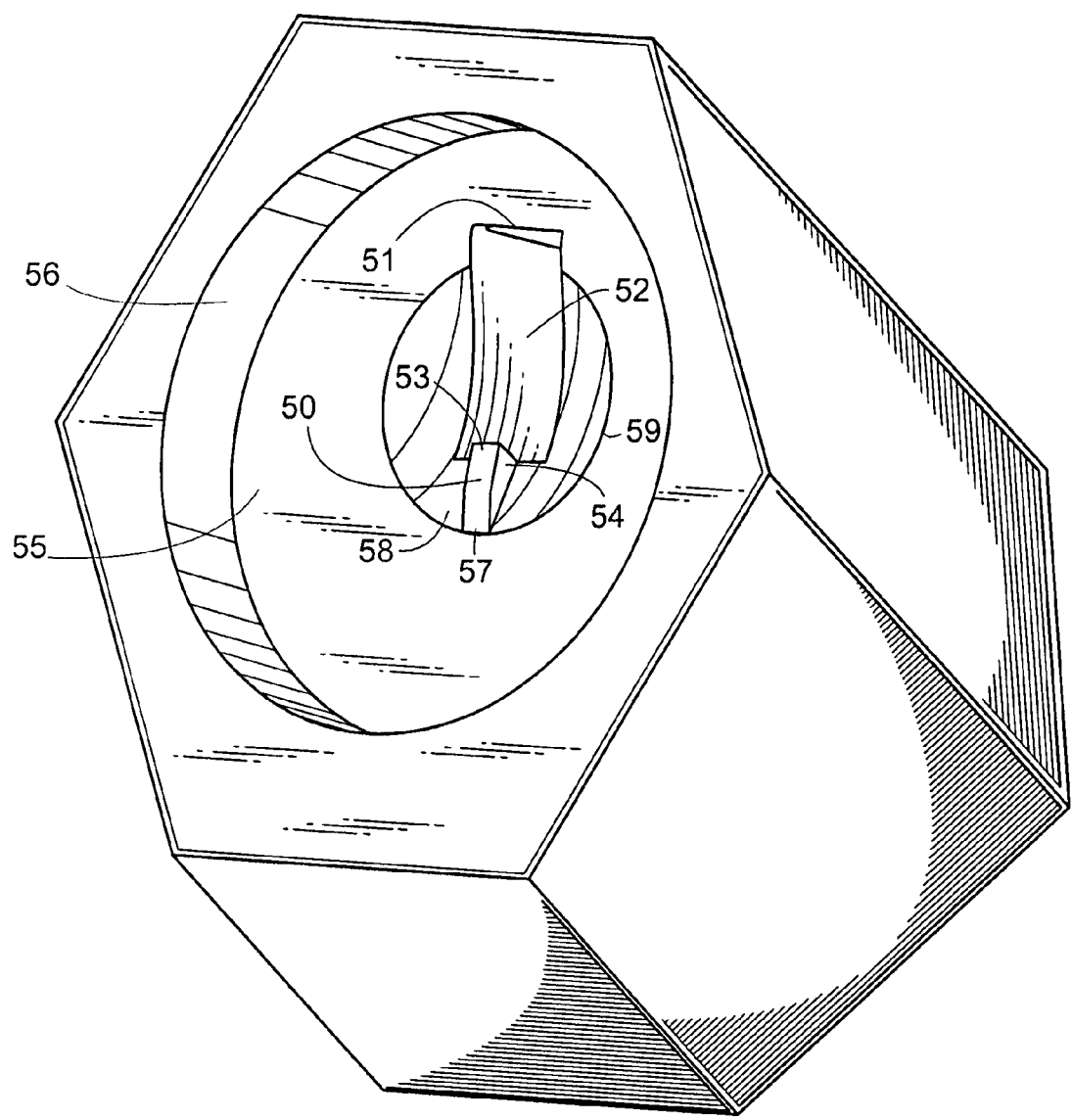
FIG. 6 is a perspective view of the present invention.

10 Dock
11 Flat Bottom
12 Upper Shell
13 Slanted Sidewalls
14 Gyroscope
15 Top Face
16 Outer Side Edges
17 Central Basin Area
18 Annular Edge
19 Lower Stepped Surface
20 Annular Wall
21 Electrically Powered Rotor
22 Elongated Opening
23 Concave Center Area
24 Mount
25 Button
26 Latches
27 Holes
30 Spring
32 Motor
33 Side Plates
34 Batteries
35 Spring
36 Wire
50 Alignment Member
51 Opening Top Edge
52 Opening Sidewall
53 Alignment Member Tip
54 Alignment Member Sidewall
55 Offset Lower Stepped Surface
56 Shallow Annular Wall
57 Alignment Member Leading Edge
58 Alignment Member Mounting Area
59 Concave Center Area Periphery

DETAILED DESCRIPTION OF THE PREFERRED EMBODIMENT

In addition to the other standard elements of the state-of-the-art gyroscopic starting dock, the present invention includes an alignment member 50 in the concave center area 23. The spring 30 is made so that it is connected more rigidly, such as by attaching the spring 30 to more than one sidewall internally, or by making the spring rigid for rigid mounting to the case. The outer housing case is preferably rigidly mounted to the spring so that the spring may absorb high-frequency vibration, but not have resilient bias as against the rotor R, such as in the prior art.

In place of the resilient spring mounting, the motor can be mounted as on a frame. The alignment member 50 is in the shape of a fin mounted below an opening top edge 51. The opening may have a pair of sidewalls 52 and shaped in a rectangular form. The alignment member has an alignment member tip 53 that extends to an edge of the opening. The alignment member tip 53 protrudes into a groove of the rotor when the rotor is spinning. The alignment member tip has a flat surface bounded by a pair of alignment member sidewalls 54. The alignment member sidewalls span from an alignment member leading edge 57 at the concave center area periphery 59. The concave center area periphery 59 is preferably a circular shape. The alignment member mounting area 58 is at an area inside of the concave center area periphery 59 between the concave center area periphery 59 and the opening. The alignment member 50 is preferably wedged shaped having a leading alignment member leading edge 57 and a trailing alignment member tip 53. The direction of the rotation of the rotor is from the leading alignment member leading edge 57 toward the trailing alignment member tip 53.

The alignment member is preferably fin shaped in the shape of a fish or dolphin fin as seen in the drawings. The alignment member is preferably made of a low friction plastic material. The driving wheel can also have a protruding ridge that extends into the groove of the rotor for improved grip. The alignment member aligns the rotor by protruding an alignment member tip into a groove of a gyroscopic rotor when the gyroscopic rotor is rotating.

The invention claimed is:

1. A gyroscope power starter comprising:
    a housing having a bottom and a concave head slanted at a predetermined angle relative to the housing, the concave head engaging a gyroscope rotor;
    an electric power source on the housing;
    a motor mounted to a housing, wherein the motor is connected to the power source for producing a rotational power in response to a switching force; and
    a power rotor connected in unity with the motor and protruding from an opening into the concave head of the housing to transmit the rotational motor power to the gyroscope rotor; and
    an alignment member formed in a concave center area, wherein the alignment member protrudes into a groove of the gyroscope rotor when the gyroscope rotor is rotating, wherein an alignment member tip comprises an apex of the alignment member, wherein the alignment member tip protrudes into the groove of the rotor when the rotor is spinning, wherein the motor is mounted to the housing.

2. The gyroscope power starter of claim 1, wherein the alignment member is in the shape of a fin mounted below an opening top edge.

3. The gyroscope power starter of claim 1, wherein the opening further includes a pair of sidewalls.

4. The gyroscope power starter of claim 1, further comprising an alignment member tip that extends to an edge of the opening.

5. The gyroscope power starter of claim 1, wherein the alignment member tip has a flat surface bounded by a pair of alignment member sidewalls, wherein the alignment member sidewalls span from an alignment member leading edge at a concave center area periphery.

6. The gyroscope power starter of claim 5, wherein the alignment member sidewalls are Delta shaped.

7. The gyroscope power starter of claim 1, wherein a concave center area periphery is a circular shape.

8. The gyroscope power starter of claim 1, wherein the alignment member mounting area is at an area inside of a concave center area periphery between the concave center area periphery and the opening.

9. The gyroscope power starter of claim 1, wherein the alignment member is preferably wedged shaped having a leading alignment member leading edge and a trailing alignment member tip.

10. The gyroscope power starter of claim 1, wherein the motor spins so that the power rotor provides a direction of rotor rotation from a leading alignment member leading edge toward a trailing alignment member tip.

* * * * *